United States Patent [19]
Maro et al.

[11] Patent Number: 5,491,018
[45] Date of Patent: Feb. 13, 1996

[54] LAMINATED PACKAGING MATERIAL

[75] Inventors: Hideharu Maro; Hideki Kodaira; Hiroshi Iwase; Yuji Komiya, all of Tokyo, Japan

[73] Assignee: Toppan Printing Co., Ltd., Tokyo, Japan

[21] Appl. No.: 405,457

[22] Filed: Mar. 16, 1995

Related U.S. Application Data

[63] Continuation of Ser. No. 107,759, filed as PCT/UP92/01722, Dec. 28, 1992, abandoned.

[30] Foreign Application Priority Data

Dec. 28, 1991  [JP]  Japan ................................. 3-358827
May 7, 1992    [JP]  Japan ................................. 4-143199
May 8, 1992    [JP]  Japan ................................. 4-143603

[51] Int. Cl.$^6$ ............................. B32B 7/12; B32B 33/00
[52] U.S. Cl. ..................... 428/200; 428/201; 428/206; 428/207; 428/346; 428/347; 428/349; 428/446; 428/448; 428/451; 428/480
[58] Field of Search ................... 428/35.3, 35.8, 428/35.9, 200, 201, 203, 204, 206, 207, 346, 347, 349, 446, 448, 451, 480, 483, 515, 517, 516, 520

[56] References Cited

U.S. PATENT DOCUMENTS 5,100,720  3/1992  Sawada et al. ................... 428/215
5,232,755  8/1993  Komiya et al. .................... 428/36.91

FOREIGN PATENT DOCUMENTS 55-163161  12/1980  Japan .
62-103139   5/1987  Japan .
1-202437    8/1989  Japan .
2212741     8/1989  United Kingdom .

OTHER PUBLICATIONS

*Database WPI*, Week 8547, Derwent Publications Ltd., London, GB; Abstract, AN 85-293901 (JP 60 203431). Oct. 15, 1985.
*Database WPI*, Week 8836, Derwent Publications Ltd., London, GB; Abstract, AN 88-254709 (JP 63 186652). Aug. 2, 1988.
*Database WPI*, Week 9037, Derwent Publications Ltd., London, GB; Abstract, AN 90-278515 (JP 2 194944). Aug. 1, 1990.
*Database WPI*, Week 9120, Derwent Publications Ltd., London, GB; Abstract, AN 91-142888 (JP 3 076640). Apr. 2, 1991.
*Patent Abstracts of Japan*, Abstract vol. 015239, Jun. 20, 1991 (JP 3 076640). Apr. 2, 1991.
International Search Report, PCT/JP92/01722 dated Mar. 23, 1993.

*Primary Examiner*—D. S. Nakarani
*Attorney, Agent, or Firm*—Staas & Halsey

[57] ABSTRACT

In a laminated packaging material including a substrate, a silicon oxide layer, an adhesive layer or anchor coat layer and a heat-sealable resin layer which are successively laminated, the adhesive layer or anchor coat layer is formed by coating a water-based adhesive composition or a water-based anchor coat agent composition, respectively, on the silicon oxide layer, followed by drying. On the anchor coat layer, a solvent-free adhesive layer may be provided. Also in a laminated packaging material including a substrate, a silicon oxide layer, an ink layer, an adhesive layer and a heat-sealable resin layer which are successively laminated, the ink layer is formed by coating a water-based ink composition on the silicon oxide layer, followed by drying. In this case, the adhesive layer may preferably be formed by coating a water-based adhesive composition on the ink layer, followed by drying. When an oil-based ink is used as the ink composition, the anchor coat layer may preferably be formed by coating a water-based anchor coat agent composition on the silicon oxide layer, followed by drying.

8 Claims, 2 Drawing Sheets

LAMINATED PACKAGING MATERIAL

This application is a continuation of application Ser. No. 08/107,759, filed as PCT/JP/01722, Dec. 28, 1992, now abandoned.

BACKGROUND OF THE INVENTION

1. Field of the Invention

This invention relates to a laminated packaging material useful as a packaging material for food, having a silicon oxide layer as a layer with gas barrier properties, in particular, oxygen and water-vapor barrier properties. More particularly, the present invention relates to a laminated packaging material having superior oxygen barrier properties and water-vapor barrier properties even when it has a thin silicon oxide layer. The present invention also relates to a laminated packaging material having a silicon oxide deposited layer serving as a barrier to oxygen, water vapor, etc., and also having superior adhesion and transparency of a printed layer. The present invention still also provides a laminated packaging material having a silicon oxide deposited layer serving as a barrier to gases such as oxygen and water vapor and also having superior laminate bond strength.

2. Description of the Related Art

Packaging materials for food, as exemplified by pouch materials for retort storage of food, which have been hitherto in wide use are bags formed of a laminated packaging material comprising a polyester film as a substrate, an aluminum foil as a barrier layer and a thermoplastic resin film provided for heat sealing which are successively laminated, the whole surfaces of the bags being provided with prints to improve their decorative effect.

However, conventional materials in which aluminum foil is laminated can not be used in microwave ovens and also have the problems that the production cost of the laminated packaging material is held by the aluminum foil in a high proportion. They have another problem in that aluminum oxide turns into lumps upon thermal disposal of the laminated packaging materials making use of aluminum foil and remains as residues. Accordingly, a light-transmissive silicon oxide deposited layer formed in a thickness of 1,500 to 1,800 angstroms is available as a substitute for aluminum foil (Japanese Patent Publications No. 51-48511 and No. 52-3418).

Recently, making the most of the properties inherent in the laminated packaging material having such a light-transmissive silicon oxide deposited layer as an oxygen and water-vapor barrier layer, i.e., the properties that it causes no problem in its disposal as in aluminum foil and its contents can be seen from the outside, it is attempted to use this material as packaging materials for food such as confectionery and for medical supplies, other than packaging materials for retort storage of food.

However, the light-transmissive silicon oxide deposited layer with a thickness of 1,500 to 1,800 angstroms that is considered necessary for maintaining sufficient oxygen barrier properties and water-vapor barrier properties is reasonably yellowish. Hence, the following problems arise when the laminated packaging material having such a silicon oxide deposited layer is used for those other than retort storage food.

When the laminated packaging material having the silicon oxide deposited layer is used in retort pouches, it becomes necessary to apply prints to its whole surface in order to protect the contents from outdoor daylight, and hence the silicon oxide deposited layer can not be directly viewed. On the other hand, when used in the packaging of confectionery or the like, it is unnecessary to apply prints to the whole surface which result in a cost increase, or rather it is common to apply prints to the silicon oxide layer only in part so that the contents can be visually seen. As a result, the light having transmitted through the silicon oxide layer directly reaches eyes. Hence, there is the problem that the contents look yellowish undesirably and no original colors of the contents can be represented. Moreover, the silicon oxide deposited layer with a thickness of 1,500 to 1,800 angstroms is reasonably so rigid that it lacks in flexibility, and also there is an additional problem that the formation of films in such thickness requires a cost.

In order to solve this problem and also lower the cost of production, it is attempted to make the thickness of the silicon oxide deposited layer not larger than 800 angstroms. When, however, the silicon oxide deposited layer is made thin enough to be substantially colorless, the oxygen barrier properties do not so much become lower but the water-vapor barrier properties become greatly lower to bring about a problem in practical use.

Incidentally, Japanese Patent Publication No. 52-3418 discloses a technique in which a silicon oxide deposited layer is formed on a base film and the resulting silicon oxide deposited layer is anchor-coated with an organic anchor coat material, followed by extrusion lamination of a polyolefin resin as a heat-sealable resin layer to produce a laminate film, or a technique in which a silicon oxide deposited layer is formed on a base film and a polyolefin resin film as exemplified by a polyethylene film is laminated to the resulting silicon oxide deposited layer via an adhesive layer to produce a laminate film.

The lamination of a heat-sealable resin layer to the silicon oxide deposited layer, however, has been involved in the problem that no satisfactory laminate strength can be imparted to laminated packages if conventional usual organic anchor coat materials are used or adhesives are used.

When packages are produced from such laminated packaging materials, a printed layer is commonly formed on the silicon oxide deposited layer as previously stated, in order to display contents of the packages or to improve design of the packages. If the printed layer is formed after the silicon oxide deposited layer has been anchor-coated with a conventional organic anchor coat material, plain areas of the package in which no printed layer is present become greatly turbid to make the transparency of the laminated packaging material lower. Hence, there has been also the problem that it becomes impossible to view original colors of the contents having been packaged.

Accordingly, in order to laminate the heat-sealable resin layer to the silicon oxide deposited layer in a sufficient bond strength and also to maintain the transparency of the laminated packaging material at a high level, the heat-sealable resin layer has had to be bonded by dry lamination using a special adhesive containing a silane coupling agent (e.g., AD980, available from Toyo Ink Mfg. Co., Ltd.).

Such a special adhesive, however, is so expensive that it has brought about the problem of a high production cost for the laminated packaging material. Such a special adhesive is also a two-part reactive type, and has had the problem that it is not a solvent-free adhesive that requires no organic solvent in production steps and is cost-advantageous.

In the packaging of food, etc., it is common, as mentioned above, to form a printed layer on the silicon oxide deposited layer in order to decorate laminated packaging materials or display their contents. When in such a case an inexpensive ink usually used, i.e., an ink comprising an ink binder prepared by mixing a polyamide or alkyd resin into a nitrocellulose resin is used as a printing ink, the printed layer can not have a sufficient bond strength to the silicon oxide deposited layer and the packaging materials can not be used as they are.

Now, in order to improve the bond strength of such a printed layer, it is attempted to use a urethane type ink containing an expensive silane coupling agent, or to previously form an organic anchor coat layer on the silicon oxide deposited layer and thereafter form a printed layer using an inexpensive ink usually used.

However, the use of the urethane type ink containing an expensive silane coupling agent results in an increase in the cost of production of laminated packaging materials, so that there has been the problem that use of such laminated packaging materials as packaging materials for food, etc. results in an increase in the cost of packaging materials with respect to that of the food packaged.

To previously form an organic anchor coat layer on the silicon oxide deposited layer and thereafter form a printed layer using an inexpensive ink usually used can bring about a certain improvement in bond strength between the printed layer and the silicon oxide deposited layer, but the plain areas in which no printed layer is present become greatly turbid to make the transparency of the film lower. Hence, there also has been the problem that it becomes impossible to view original colors of the contents having been packaged.

The present invention intends So solve the problems involved in the prior art, and a first object thereof is to make it possible to produce a laminated packaging material that may have no practical problem in oxygen barrier properties and water-vapor barrier properties even when the silicon oxide layer such as the silicon oxide deposited layer is thinly formed, and has a rich flexibility.

A second object of the present invention is to make it possible to achieve a sufficient laminate bond strength in a laminated packaging material comprising a substrate film and having thereon a silicon oxide layer and a heat-sealable resin layer, even when the heat-sealable resin layer is bonded using an inexpensive adhesive commonly used, and also makes it possible to maintain the transparency of the laminated packaging material at a high level, in particular, makes it possible to achieve a sufficient laminate bond strength and a high transparency in the laminated packaging material even when a solvent-free adhesive that is advantageous to production steps is used.

A third object of the present invention is, in a laminated packaging material comprising a substrate film, a silicon oxide layer formed thereon and a printed layer formed on this layer, to make the adhesion between the printed layer and the silicon oxide layer sufficiently high and to eliminate the problem of a lowering of the transparency of the plain areas in which no printed layer is present.

SUMMARY OF THE INVENTION

The present inventors have discovered that the above first object can be achieved by coating a water-based adhesive composition, a water-based anchor coat agent composition or a water-based ink composition on the silicon oxide layer of the laminated packaging material. They have thus accomplished a first mode of the present invention.

The first-mode present invention provides as a first embodiment thereof a laminated packaging material comprising a substrate, a silicon oxide layer, an adhesive layer or anchor coat layer and a heat-sealable resin layer which are successively laminated, wherein the adhesive layer or anchor coat layer is formed by coating a water-based adhesive composition or a water-based anchor coat agent composition, respectively, on the silicon oxide layer, followed by drying.

The first-mode present invention also provides as a second embodiment thereof a laminated packaging material comprising a substrate, a silicon oxide layer, an ink layer, an adhesive layer and a heat-sealable resin layer which are successively laminated, wherein the ink layer is formed by coating a water-based ink composition on the silicon oxide layer, followed by drying. In this case, the adhesive layer may preferably be also formed by coating a water-based adhesive composition on the ink layer, followed by drying.

The present inventors have also discovered that the above second object can be achieved by previously treating a silicon oxide layer with a water-based anchor coat material to form an anchor coat layer before a heat-sealable resin layer is laminated to the silicon oxide layer by the use of an adhesive. They have thus accomplished a second mode of the present invention.

The second-mode present invention provides a laminated packaging material comprising a substrate, a silicon oxide layer, an anchor coat layer, an adhesive layer and a heat-sealable resin layer which are successively laminated, wherein the anchor coat layer is formed by coating a water-based anchor coat agent composition on the silicon oxide layer, followed by drying. In this case, the adhesive layer may preferably be formed of a solvent-free adhesive composition.

The present inventors have also discovered that the above third object can be achieved by previously treating a silicon oxide layer with a water-based anchor coat material before an ink layer is formed on the silicon oxide layer. They have thus accomplished a third mode of the present invention.

The third-mode present invention provides a laminated packaging material comprising a substrate, a silicon oxide layer, an anchor coat layer and an ink layer which are successively laminated, wherein the anchor coat layer is formed by coating a water-based anchor coat agent composition on the silicon oxide layer, followed by drying. In this case, an adhesive layer and a heat-sealable resin layer may preferably be further formed on the ink layer.

DETAILED DESCRIPTION OF THE PREFERRED EMBODIMENTS

Figure 1:
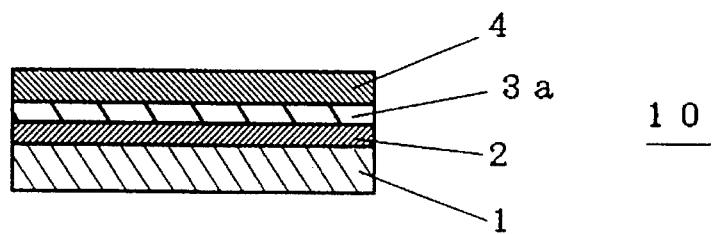
FIG. 1 is a cross-sectional view of a preferred laminated packaging material according to the first embodiment of the first-mode present invention.

The present invention will be described below in detail with reference to the drawings. In the drawings, the same reference numeral denotes the same or equivalent constituents.

FIG. 1 is a cross-sectional view of a preferred laminated packaging material 10 according to the first embodiment of the first-mode present invention. The laminated packaging material 10 has a structure comprised of a substrate 1, a silicon oxide layer 2, an adhesive layer 3a and a heat-sealable resin layer 4 which are successively laminated.

The substrate 1 functions as a support of the laminated packaging material. As the substrate 1, flexible resin films such as polyethylene, polypropylene and polyester can be used. The thickness of the substrate can be appropriately selected depending on purpose, without any particular limitations.

The silicon oxide layer 2 is a layer provided to impart gas barrier properties, in particular, oxygen barrier properties and water-vapor barrier properties, to the laminated packaging material. Such a silicon oxide layer 2 can be formed by conventional methods. For example, it can be formed by vacuum deposition, ion plating, sputtering, plasma-assisted vacuum deposition or CVD, and preferably by vacuum deposition, which has a great cost advantage.

The silicon oxide layer 2 is composed of a mixture of a silicon compound represented by the formula: $Si_xO_y$ (wherein x is 1 or 2, and y is 0, 1, 2 or 3) mainly comprising silicon monoxide. The silicon oxide layer may have a thickness, though variable depending on colors selected, usually of from 100 to 1,500 angstroms, preferably from 100 to not more than 800 angstroms, and more preferably from 200 to 500 angstroms, taking account of flexibility.

The adhesive layer 3a is formed by coating on the silicon oxide layer 2 a water-based adhesive composition making use of water or a mixed solvent containing water, followed by drying, and the layer thus formed is used. Such an adhesive composition is exemplified by water-based acrylic adhesives and water-based EVA (an ethylene/vinyl acetate copolymer) adhesives, which are adhesive compositions for dry lamination and any of which can be used. Bringing the water-based adhesive composition into contact with the silicon oxide layer 2 in this way enables improvement of oxygen barrier properties and water-vapor barrier properties of the silicon oxide layer 2.

The heat-sealable resin layer 4 is provided to impart to the laminated packaging material 10 a heat-sealability necessary to form the laminated packaging material 10 into, e.g., a baglike package. As resins usable as materials for such a heat-sealable resin layer 4, materials like those conventionally used can be used, as exemplified by polyolefin resins such as polyethylene and polypropylene, an ethylene/vinyl acetate copolymer, and ionomers.

The thickness of the heat-sealable resin layer 4 can be appropriately selected as occasion calls, without any particular limitations. For example, it may preferably have a thickness of usually from about 50 μm to about 100 μm in view of production cost and heat-sealability.

The laminated packaging material shown in FIG. 1 can be produced by conventional methods. For example, on the substrate 1, the silicon oxide layer 2 is formed by vacuum deposition, and the water-based adhesive composition is coated thereon using a gravure plate, a flat plate, a coater or the like, followed by drying in a drying stove kept at about 80° C. Thereafter, a heat-sealable resin film is superposed thereon, followed by dry lamination to form the heat-sealable resin layer 4. The packaging material can be thus produced.

Figure 2:
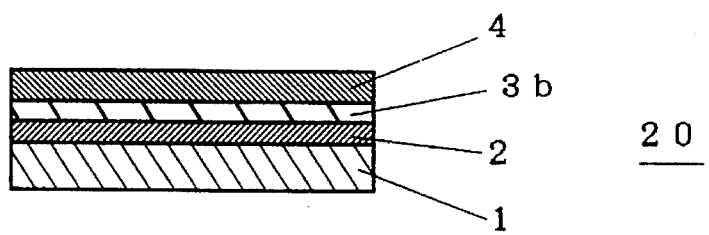
FIG. 2 is a cross-sectional view of a laminated packaging material of another embodiment according to the first embodiment of the first-mode present invention.

FIG. 2 is a cross-sectional view of a laminated packaging material 20 of another embodiment according to the first embodiment of the first-mode present invention. The laminated packaging material 20 of this embodiment comprises a substrate 1, 8 silicon oxide layer 2, an anchor coat layer 3b and a heat-sealable resin layer 4 which are successively laminated. That is, it has a structure in which the adhesive layer 3a of the laminated packaging material of FIG. 1 is replaced with the anchor coat layer 3b.

The anchor coat layer 3b is formed by coating on the silicon oxide layer 2 a water-based anchor coat agent composition making use of water or a mixed solvent containing water, followed by drying, and the layer thus formed is used. Such an anchor coat agent composition may include water-based polyethyleneimine type anchor coat materials (e.g., P-1000, available from Nippon Shokubai Kagaku Kogyo Co.,Ltd), water-based polybutadiene type anchor coat materials (e.g., EL451, available from Toyo Ink Mfg. Co., Ltd.), water-based urethane type anchor coat materials (e.g., T-185, available from Nippon Soda Co., Ltd.), water-based acrylic anchor coat materials (e.g., VM- 128, available from Toyo Ink Mfg. Co., Ltd.), which are anchor coat agent compositions for extrusion lamination and any of which can be preferably used. Bringing the water-based anchor coat agent composition into contact with the silicon oxide layer 2 in this way enables improvement of oxygen barrier properties and water-vapor barrier properties of the silicon oxide layer 2.

The anchor coat layer 3b may preferably be formed in a thickness of from 0.2 to 2 μm .

The laminated packaging material shown in FIG. 2 can be produced by conventional methods. For example, on the substrate 1, the silicon oxide layer 2 is formed by vacuum deposition, and the water-based anchor coat agent composition is coated thereon using a gravure plate, a flat plate, a coater or the like, followed by drying in a drying stove kept at about 80° C. Thereafter, a heat-sealable resin is laminated thereto by extrusion lamination to form the heat-sealable resin layer 4. The packaging material can be thus produced.

Figure 3:
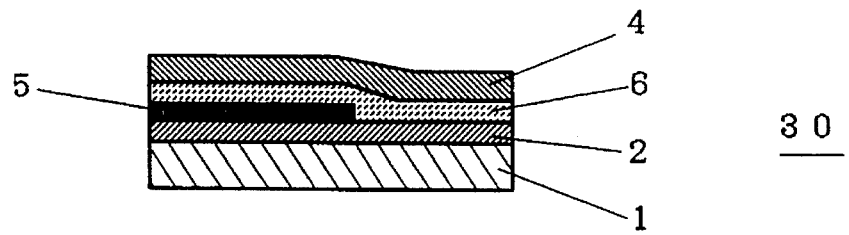
FIG. 3 is a cross-sectional view of a preferred laminated packaging material according to the second embodiment of the first-mode present invention.

FIG. 3 is a cross-sectional view of a laminated packaging material 30 according to the second embodiment of the first-mode present invention. The laminated packaging material 30 shown in this drawing comprises a substrate 1, a silicon oxide layer 2, an ink layer 5 and a heat-sealable resin layer 4 which are successively laminated.

The ink layer 5 is formed by coating on the silicon oxide layer 2 a water-based ink agent composition making use of water or a mixed solvent containing water, followed by drying, and the layer thus formed is used. For example, water-based inks usually used in printing on packaging materials can be used. Bringing the water-based ink composition into contact with the silicon oxide layer 2 in this way enables improvement of oxygen barrier properties and water-vapor barrier properties of the silicon oxide layer 2.

The adhesive layer 6 is a layer provided to bond the heat-sealable resin layer 4. When the ink layer 5 is solid-printed over the whole surface, the adhesive layer 6 may be formed using a commonly available adhesive. When the silicon oxide layer 2 not covered with the ink layer 5 is present, a layer formed of the same water-based adhesive composition as used in the adhesive layer 3a described in relation to FIG. 1 may preferably be used as the adhesive layer 5 so that the uncovered part can be improved in oxygen barrier properties and water-vapor barrier properties. Other constituents are as described in relation to FIG. 1.

The laminated packaging material 30 shown in FIG. 3 can also be produced by conventional methods. For example, on the substrate 1, the silicon oxide layer 2 is formed by vacuum deposition, and the water-based ink composition is coated thereon using a gravure plate, a flat plate, a coater or the like, followed by drying to form the ink layer 5. Thereafter, an adhesive composition is coated, followed by drying to form the adhesive layer 6 and further a heat-sealable resin film is superposed thereon, followed by dry lamination to form the heat-sealable resin layer 4. The packaging material can be thus produced.

The laminated packaging material of the first-mode present invention as described above may be made into a suitable form, e.g., the form of a bag, and can be put into use in the same manner as conventionally done.

As described above, in the laminated packaging material of the first-mode present invention, the water-based adhesive composition, the water-based anchor coat agent composition or the water-base ink composition is coated on the silicon oxide layer, and hence it becomes possible to achieve the same oxygen barrier properties and water-vapor barrier properties as those of a thick silicon oxide deposited layer with a thickness of about 1,500 to 1,800 angstroms, even when the silicon oxide layer is thinly formed.

Figure 4:
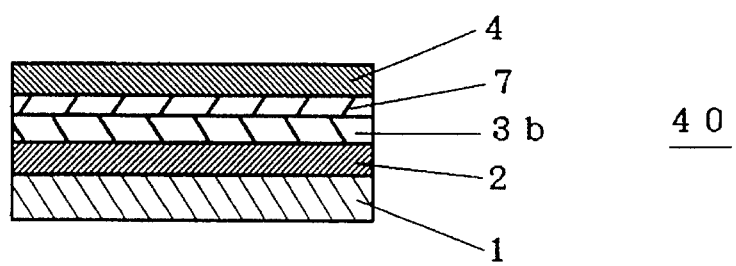
FIG. 4 is a cross-sectional view of a preferred laminated packaging material according to the second-mode present invention.

FIG. 4 is a cross-sectional view of a preferred laminated packaging material 40 according to the second-mode present invention. The laminated packaging material 40 shown in this drawing comprises a substrate 1, a silicon oxide layer 2, an anchor coat layer 3b, an adhesive layer 7 and a heat-sealable resin layer 4 which are successively laminated.

In the laminated packaging material 40 shown in FIG. 4, the substrate 1, the silicon oxide layer 2, the anchor coat layer 3b and the heat-sealable resin layer 4 are as described in relation to FIGS. 1 and 2. Here, the anchor coat layer 3b is provided to improve the adhesion of the adhesive layer 7. This anchor coat layer 3b is a layer formed by coating the water-based anchor coat agent composition on the silicon oxide layer 2, followed by drying, and is as described in relation to FIG. 2. Hence, it becomes possible not only to improve the adhesion of the adhesive layer 7 but also to improve the oxygen barrier properties and water-vapor barrier properties of the silicon oxide layer 2. It also becomes possible not to lower the transparency of the laminated packaging material because of use of no organic solvent type anchor coat materials.

The adhesive layer 7 can be formed of commonly available adhesives of various types. In view of clogging of plates, workability and cost, it may preferably be formed of an adhesive composition containing no coupling agent. Preferable adhesive compositions are exemplified by polyester type adhesives (e.g., AD-1050, AD-980, available from Toyo Morton Co.), polyether type adhesives (e.g., AD-305, available from Toyo Morton Co.), and also solvent-free adhesive compositions containing no organic solvent (e.g., ADN-313A/B, ADN-347, ADN,401A/B, ADN-403, available from Toyo Morton Co.). In particular, in view of workability and cost, solvent-free adhesive compositions are preferred.

The laminated packaging material shown in FIG. 4 can be produced by conventional methods. For example, on the substrate 1, the silicon oxide layer 2 is formed by vacuum deposition, and the water-based anchor coat agent composition is coated thereon using a gravure plate, a flat plate, a coater or the like, followed by drying to form the anchor coat layer 3b. Thereafter, an adhesive composition is coated, followed by drying to form the adhesive layer 7 and further a heat-sealable resin film is superposed thereon, followed by dry lamination to form the heat-sealable resin layer 4. The packaging material can be thus produced.

Figure 5:
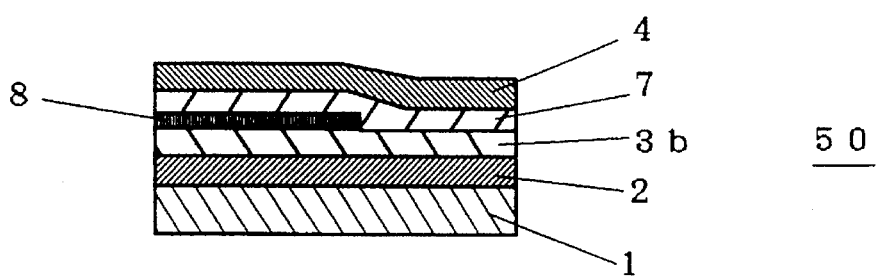
FIG. 5 is a cross-sectional view of a preferred laminated packaging material according to the second-mode and third-mode present invention.

FIG. 5 is a cross-sectional view of a preferred laminated packaging material 50 according to the second-mode and third-mode present invention. The laminated packaging material 50 shown in this drawing comprises a substrate 1, a silicon oxide layer 2, an anchor coat layer 3b, an ink layer 8, an adhesive layer 7 and a heat-sealable resin layer 4 which are successively laminated.

In the laminated packaging material 50 shown in FIG. 5, the substrate 1, the silicon oxide layer 2, the anchor coat layer 3b, the adhesive layer 7 and the heat-sealable resin layer 4 are as described in relation to FIGS. 1 and 2. Here, the anchor coat layer 3b is provided to improve the adhesion between the silicon oxide layer 2 and the ink layer 8. This anchor coat layer 3b is a layer formed by coating the water-based anchor coat agent composition on the silicon oxide layer 2, followed by drying, and is as described in relation to FIG. 2. Hence, it becomes possible to not only improve the adhesion of the ink layer 8 but also improve the adhesion of the adhesive layer 7 formed on the silicon oxide layer 2 not covered with the ink layer 8, and also to improve the oxygen barrier properties and water-vapor barrier properties of the silicon oxide layer 2. It also becomes possible not to lower the transparency of the laminated packaging material at its part not covered with the ink layer 8, because of use of no organic solvent type anchor coat materials.

The ink layer 8 on the anchor coat layer 3b is commonly provided when the laminated packaging material 50 is used in packages, to impart a given indication to be shown on the packages or to provide the desired design. There are no particular limitations on the ink composition that forms this ink layer 8. The ink layer may be formed of an expensive urethane type ink composition, but can preferably be formed of an inexpensive ink commonly put into wide use. For example, well lustrous ink compositions making use of an ink binder prepared by mixing a polyamide into a nitrocellulose resin (e.g., GNCST, available from Toyo Ink Mfg. Co., Ltd.; CAMZ, available from Dainippon Ink & Chemicals, Incorporated) and ink compositions making use of an ink binder prepared by mixing an alkyd resin into a nitrocellulose resin (e.g., CCST, available from Toyo Ink Mfg. Co., Ltd.; CLS, available from Dainippon Ink & Chemicals, Incorporated) can be preferably used.

In the laminated packaging material shown in FIG. 5, all the layers shown in the drawing are essential constituents for the embodiment of the second-mode present invention. As the embodiment of the third-mode present invention, the adhesive layer 7 and the heat-sealable resin layer 4 are not essential. When, however, the laminated packaging material is used as a packaging material to which heat sealing is applied, the embodiment shown in FIG. 5 is preferably formed as an embodiment included in the laminated packaging material of the third-mode present invention.

The laminated packaging material shown in FIG. 5 can be produced by conventional methods. For example, on the substrate 1, the silicon oxide layer 2 is formed by vacuum deposition, and the water-based anchor coat agent composition is coated thereon using a gravure plate, a flat plate, a coater or the like, followed by drying to form the anchor coat layer 3b. Thereafter, an ink composition is coated to form the ink layer 8, further an adhesive composition is coated to form the adhesive layer 7, and still further a heat-sealable resin film is superposed thereon, followed by dry lamination to form the heat-sealable resin layer 4. The packaging material can be thus produced.

Thus, in the laminated packaging material of the second-mode and third-mode present invention, the water-based anchor coat layer is formed on the silicon oxide layer and the adhesive layer or the ink layer is formed thereon. Hence, the adhesion of the adhesive layer or ink layer can be improved. In particular, even when the ink layer is formed using a well lustrous and expensive ink as commonly used, its adhesion can be well improved. In addition, the transparency of the plain areas of the laminated packaging material in which no ink layer is present can be maintained at a high level.

EXAMPLES

The present invention will be described below in greater detail by giving Examples.

EXAMPLE 1

On one side of a 12 μm thick biaxially oriented polyethylene terephthalate (PET) film (trade name: P-11; available from Toray Industries, Inc.), a silicon oxide layer was formed by vacuum deposition in a thickness of 800 angstroms, and an ink layer was partly formed thereon in a dried coating thickness of 2 μm using an oil-based ink (LP SUPER, available from Toyo Ink Mfg. Co., Ltd.).

Figure 6:
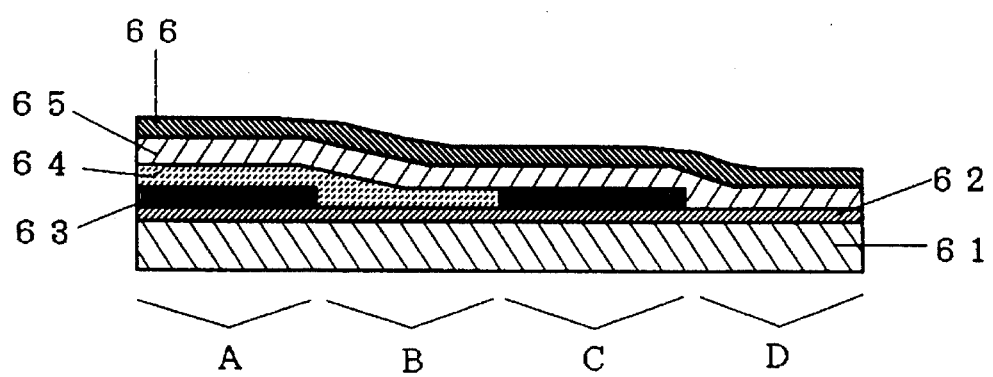
FIG. 6 is a cross-sectional view of a laminated packaging material prepared in Example 1.

On this ink layer, a butadiene type anchor coat material (EL451; water content: 10%) was coated, followed by drying at 50° C. While polyethylene was coated thereon by extrusion in a thickness of 15 μm, a 20 μm thick polypropylene film was laminated. The laminated material thus produced is cross-sectionally shown in FIG. 6. In the drawing, reference numeral 51 denotes a PET film base; 62, a silicon oxide layer; 63, an ink layer; 64, an anchor coat layer; 65, a polyethylene layer; and 66, a polypropylene layer. In the drawing, part A is the part where the silicon oxide layer 62 is covered with the ink layer 64, part B is the part where the silicon oxide layer 62 is covered with not the ink layer 63 but the anchor coat layer 64. Part C is the part where the silicon oxide layer is covered with the ink layer 63 like part A but has no anchor coat layer 64 on the ink layer. Part D is the part where the silicon oxide layer 52 is covered with neither the ink layer 63 nor the anchor coat layer 64.

On these parts A to D, water vapor transmission (WVTR, g/m².day) was measured in regard to their water-vapor barrier properties, under atmospheric pressure under conditions of 40° C. and 100%RH using a water vapor transmission tester (PERMATRAN-W TWIN, manufactured by Modern Controls, Inc.). Oxygen transmission (O$_2$TR, cc/m².day) was also measured in regard to their oxygen barrier properties, under atmospheric pressure under conditions of 25° C. and 100%RH using OX-TRANIO/50A (manufactured by Modern Controls, Inc.). Results obtained are shown in Table 1. The WVTR of a material in which only the silicon oxide layer was laminated to the PET film base was 5.0 g/m².day and the O$_2$TR thereof was 4.4 cc/m².day. The WVTR in the state where only the ink layer was laminated was 2.6 g/m².day and the O$_2$TR in that state was 3.0 cc/m².day.

As is clear from Table 1, in the laminated packaging material of the present Example, its oxygen barrier properties and water-vapor barrier properties are improved at the part where the silicon oxide layer has been treated with the anchor coat agent.

TABLE 1

| Laminated packaging material of Example 1 | WVTR | O$_2$TR |
| --- | --- | --- |
| Part A | 2.1 | 2.5 |
| Part B | 1.4 | 0.9 |
| Part C | 2.2 | 2.9 |
| Part D | 2.9 | 4.5 |

EXAMPLE 2

A laminated packaging material was produced in the same manner as in Example 1 except that 1000Sl, available from Toyo Ink, was used as a substrate comprising a base film having thereon a 1,000 angstrom thick silicon oxide layer. On this material, the oxygen barrier properties and water-vapor barrier properties were measured in the same manner as in Example 1. Results obtained are shown in Table 2. The WVTR of the Toyo Ink 1000Sl was 1.5 g/m².day and the O$_2$TR was 1.9 cc/m².day. The WVTR in the state where only the ink layer was laminated was 1.6 g/m².day and the O$_2$TR in that state was 1.5 cc/m².day.

TABLE 2

| Laminated packaging material of Example 2 | WVTR | O$_2$TR |
| --- | --- | --- |
| Part A | 1.1 | 1.7 |
| Part B | 0.7 | 0.6 |
| Part C | 1.0 | 1.6 |
| Part D | 1.0 | 1.7 |

EXAMPLE 3

A laminated packaging material was produced in the same manner as in Example 1 except that the silicon oxide layer was formed in a thickness of 400 angstroms. On this material, the oxygen barrier properties and water-vapor barrier properties were measured in the same manner as in Example 1. Results obtained are shown in Table 3.

The WVTR of a material in which only the silicon oxide layer was laminated to the PET film base was 24.0 g/m².day and the O$_2$TR thereof was 2.2 cc/m².day.

TABLE 3

| Laminated packaging material of Example 3 | WVTR | O$_2$TR |
| --- | --- | --- |
| Part A | 5.0 | 2.5 |
| Part B | 1.8 | 2.0 |
| Part C | 5.1 | 2.5 |
| Part D | 5.4 | 2.7 |

EXAMPLE 4

A laminated packaging material was produced in the same manner as in Example 1 except that an acrylic water-based ink (AQUACOLOR, available from Toyo Ink Mfg. Co., Ltd.) was used as the ink and a urethane type oil-based anchor coat material (AD980AB, available from Toyo Ink Mfg. Co., Ltd.) was used in the anchor coat layer. On this material, the oxygen barrier properties and water-vapor barrier properties were measured in the same manner as in Example 1. Results obtained are shown in Table 4.

The WVTR of a material in which only the silicon oxide layer was laminated to the PET film base was 24.0 g/m².day and the O₂TR thereof was 2.2 cc/m².day.

TABLE 4

| Laminated packaging material of Example 4 | WVTR | O₂TR |
| --- | --- | --- |
| Part A | 1.8 | 2.0 |
| Part B | 5.2 | 2.6 |
| Part C | 1.9 | 2.0 |
| Part D | 5.4 | 2.7 |

EXAMPLE 5

On one side of a 12 μm thick polyester film, a silicon oxide layer was formed by vacuum deposition in a thickness of 400 angstroms, and water-based polyethyleneimine (P-1000, available from Nippon Shokubai Kagaku Kogyo Co., Ltd.) as a water-based anchor coat material was coated on the surface of this silicon oxide layer in a coating weight of 1.2 g/m² (0.2 to 0.5 μm) using a gravure plate with a plate depth of 26 μm, followed by drying to form an anchor coat layer. Next, on the anchor coat layer, solid printing was partly carried out using a usual gravure printing ink (GNCST, available from Toyo Ink Mfg. Co., Ltd.) to form a printed layer. Then, on this printed layer, a solvent-free adhesive (ADN- 347, available from Toyo Morton Co.) was coated in a coating weight of 1.2 g/m² (about 1 μm) using a solvent-free type laminator, and an unoriented polypropylene film (thickness: 25 μm) was laminated thereto to produce a laminated film.

A solid-print area of this laminated film was cut in a width of 15 mm to measure its bond strength between the polyester film and the polypropylene film. As a result, it broke at the interface between the silicon oxide layer and the printed layer and its strength was 230 to 240 g/15 mm width. Similarly, bond strength at a plain area of the laminate film was also measured to reveal that it was 230 to 260 g/15 mm width. Turbidity of the plain area was also measured to reveal that it was at a haze of 6.30.

EXAMPLE 6

A laminated film was produced in the same manner as in Example 5 except that no printed layer was formed on the anchor coat layer. Bond strength and turbidity were measured. As a result, its bond strength was 230 to 260 g/15 mm width, and the turbidity was at a haze of 6.30.

COMPARATIVE EXAMPLE 1

A laminated film was produced in the same manner as in Example 5 except that no anchor coat was formed on the surface of the silicon oxide layer. Bond strength and turbidity were measured. As a result, this laminated film broke also at the interface between the silicon oxide layer and the printed layer, but its strength was only 180 g/15 mm width at the printed area and 30 to 40 g/15 mm width at the plain area, and the turbidity of the plain area was at a haze of 6.30.

COMPARATIVE EXAMPLE 2

A laminated film was produced in the same manner as in Example 5 except that the water-based anchor coat material was replaced with a urethane type organic anchor coat material (trade name: LP SUPER 301; available from Toyo Ink Mfg. Co., Ltd.). Its bond strength and turbidity were measured. As a result, the strength of this laminated film was only 180 g/15 mm width at the printed area and 170 g/15 mm width at the plain area. Its turbidity of the plain area was at a haze of 6.88.

INDUSTRIAL UTILITY

As described above, the laminated packaging material according to the present invention is particularly useful as a packaging material for food, medical supplies, etc.

We claim:

1. A laminated packaging material, comprising:
   a substrate;
   a silicon oxide layer formed on the substrate;
   a water-based adhesive layer or a water-based anchor coat layer, formed on the silicon oxide layer; and
   a heat-sealable resin layer formed on the adhesive layer or anchor coat layer.

2. A laminated packaging material, comprising:
   a substrate;
   a silicon oxide layer formed on the substrate;
   a water-based ink layer formed on the silicon oxide layer;
   an adhesive layer formed on the ink layer; and
   a heat-sealable resin layer formed on the adhesive layer.

3. The laminated packaging material according to claim 2, wherein said adhesive layer is a water-based adhesive layer.

4. A laminated packaging material, comprising:
   a substrate;
   a silicon oxide layer formed on the substrate;
   a water-based anchor coat layer formed on the silicon oxide layer;
   an adhesive layer formed on the anchor coat layer; and
   a heat-sealable resin layer formed on the adhesive layer.

5. The laminated packaging material according to claim 4, wherein said adhesive layer is formed of a solvent-free adhesive composition.

6. A laminated packaging material, comprising:
   a substrate;
   a silicon oxide layer formed on the substrate;
   a water-based anchor coat layer formed on the silicon oxide layer; and
   an ink layer formed on the anchor coat layer.

7. The laminated packaging material according to claim 6, further comprising:
   an adhesive layer formed on the ink layer; and
   a heat-sealable resin layer formed on the adhesive layer.

8. The laminated packaging material according to claim 7, wherein said adhesive layer is formed of a solvent-free adhesive composition.

* * * * *

UNITED STATES PATENT AND TRADEMARK OFFICE
CERTIFICATE OF CORRECTION

PATENT NO. : 5,491,018
DATED : February 13, 1996
INVENTOR(S) : Hideharu MARO et al.

It is certified that error appears in the above-indentified patent and that said Letters Patent is hereby corrected as shown below:

<u>On the Cover Page</u>, item [63], "PCT/UP92/01722, Dec. 28, 1992" should be --PCT/JP92/01722, August 20, 1993--.

<u>Col. 1,</u>   line 4, change "PCT/JP/01722, Dec. 28, 1992" to --PCT/JP92/01722, August 20, 1993--;
         line 62, after "storage" insert --of--.
<u>Col. 3,</u>   line 31, change "So" to --to--.
<u>Col. 6,</u>   line 9, change "8" to --a--.
<u>Col. 9,</u>   line 55, change "OX-TRANIO/50A" to --OX-TRAN10/50A--
<u>Col. 12,</u>  line 19, change "substrate;." to --substrate;--.

Signed and Sealed this

Twenty-eighth Day of May, 1996

*Attest:*

BRUCE LEHMAN

*Attesting Officer*    Commissioner of Patents and Trademarks